United States Patent [19]

Stascheit

[11] Patent Number: 5,074,224
[45] Date of Patent: Dec. 24, 1991

[54] PLATFORM DEVICE WITH RELEASABLE SUPPORTING LEGS

[75] Inventor: Kurt Stascheit, Remacheid, Fed. Rep. of Germany

[73] Assignee: Hans Jochen Eisenberg, Fed. Rep. of Germany

[21] Appl. No.: 593,806

[22] Filed: Oct. 5, 1990

[30] Foreign Application Priority Data

Dec. 9, 1989 [DE] Fed. Rep. of Germany ....... 3940809

[51] Int. Cl.$^5$ ............................................. A47B 3/06
[52] U.S. Cl. .................................... 108/156; 248/188; 403/16; 403/374
[58] Field of Search ................ 108/154, 156; 248/188, 248/188.1; 403/16, 368, 374

[56] References Cited

U.S. PATENT DOCUMENTS

| 2,954,638 | 10/1960 | Motter | 108/156 |
| 4,011,821 | 3/1977 | Neal | 108/156 |
| 4,848,245 | 7/1989 | Piretti | 108/156 |
| 4,852,837 | 8/1989 | Merten et al. | 108/156 |

FOREIGN PATENT DOCUMENTS

3225987A1 1/1984 Fed. Rep. of Germany .

Primary Examiner—Kenneth J. Dorner
Assistant Examiner—Gerald A. Anderson
Attorney, Agent, or Firm—Antonelli, Terry, Stout & Kraus

[57] ABSTRACT

A platform trestle or device for use in the construction of stages, tribunes and the like, including a rectangular frame supporting a platform, and operatively releasable support legs which can be inserted and clamped into place in mounting spaces within mounting elements which are fixedly arranged at the corners of the rectangular frame. In order to facilitate the attachment of the support legs to the mounting elements during assembly of the platform device, and to increase the seating stability of the support legs, each of the mounting spaces is fashioned as a wedge-shaped chamber which tapers toward the platform. Each wedge chamber is defined by a pair of adjoining vertical sides and pair of adjoining inclined sides, with each of the inclined sides being inclined with respect to its adjoining inclined side and at least one of the vertical sides. A sliding wedge is arranged in contact with both inclined sides and in a mounting space between the inclined sides and the support leg within each mounting element, and an unlocking device for lifting each mounting element off of the sliding wedge associated therewith is arranged at each mounting element location.

15 Claims, 7 Drawing Sheets

5,074,224

PLATFORM DEVICE WITH RELEASABLE SUPPORTING LEGS

TECHNICAL FIELD OF THE INVENTION

The present invention relates to a mounting device having a mounting element used to attach support legs to a platform or table, and, more particularly, to such a mounting element in which support legs can be inserted and clamped in order to provide support for the platform or table.

BACKGROUND OF THE INVENTION

Platform trestle devices for use in the erection of stages, tribunes and the like have been proposed in which a rectangular frame supports a platform and operatively releasable support legs can be inserted and clamped within mounting spaces of mounting elements fixedly arranged at the corners of the rectangular frame in order elevate and support the platform.

In such a platform trestle device, as shown in DE-OS 3,225,987, the mounting of the support legs within the mounting elements is carried out through the use of clamping screws which pass through the walls of the mounting elements and which engage and clamp the support legs within the mounting elements by way of angular members. Nevertheless, in systems in which clamping screws are used to engage and clamp the support legs within the mounting elements, such as the systems utilized in athletic events which are subject to various high stress forces, all of the elements used to carry out the clamping of the support legs must be relatively large and heavy in dimension to withstand the high stress forces found within such systems. Furthermore, the clamping screws, especially when not tightened properly, can come loose within the mounting elements, with the result that the support provided by the support legs is often unstable. Moreover, the use clamping screws to attach and clamp the supporting legs within the mounting elements requires a large amount of time and work, during both the assembly of the platform device and its disassembly.

SUMMARY OF THE INVENTION

An object underlying the present invention resides in the providing of a fastening device for fastening support legs of a platform device which is devoid of clamping screw connections and which can be handled quickly and efficiently, and wherein problem of clamping screw loosening, even when high stress forces are exerted on the platform of the platform device, is prevented.

In order to attain this object, the present invention is a platform trestle or device in which each mounting space for receiving one of the support legs within the mounting elements is fashioned as a wedge-shaped chamber which tapers in the direction of the platform. Each wedge chamber is defined by a pair of adjoining vertical sides and a pair of adjoining inclined sides, with each of the inclined sides being inclined with respect to its adjoining inclined side and at least one of the vertical sides. A sliding wedge is arranged in connect with both inclined sides and in a mounting space between the inclined sides and the support leg within each mounting element, and an unlocking device for lifting each mounting element off of the sliding wedge associated therewith is arranged at each mounting element location.

By virtue of the above-noted features of the present invention, both the assembly and the disassembly of the platform device can be greatly simplified. Since, for the purpose of securing the support legs beneath the platform, the support legs are simply pushed into the portion of the mounting space or wedge chamber not occupied by the sliding wedge rather than being secured therein with clamping screws, the securing of the support legs is facilitated and can be achieved by simply lifting the platform and inserting the support legs from below. When the platform is subsequently released so that the weight of the platform impinges upon the inserted support legs, the support legs are automatically braced against the mounting elements arranged at the corners of the rectangular frame by way of the sliding wedges, and the clamping connection between the mounting members and the support legs strengthens as the load on the platform increases. Thus, due to the simplified clamping arrangement of the present invention, no special manipulation, such as the insertion and rotation of clamping screws, is required in order to carry out the clamping of the support legs within the wedge chamber of the mounting elements.

Alternatively, by virtue of the present invention, the support legs can be inserted into the wedge chamber of the mounting elements while the platform is lying on its back. In this type of alternative assembly, light pressure need only be applied to the support legs to actuate the self-holding function of the mounting elements, and thereafter, the platform device need only be turned over and positioned with the feet of the support legs on the ground. As discussed above, the weight of the platform will then cause the clamping force between the mounting elements and the support legs to increase, and by further increasing the load on the platform, the clamping force of the clamping connection can be further augmented.

Additionally, the present invention is advantageously versatile in that it can be used with either square or round support legs. Particularly in the case where square support legs are being utilized, the configuration of the present invention is advantageous in that the clamping forces are distributed uniformly over a large area including all four sides of the support legs and all four inner sides of the wedge chambers of the mounting elements, such that only relatively small and lightweight parts need be used to effect the clamping action rather than relatively large and heavy clamping screws and the like.

Yet a further advantage of the present invention resides in the simplification of the release of the supporting legs. In this connection, the mounting elements located at the rectangular frame corners are simply lifted off the sliding wedges, whereupon the support legs can be pulled out or withdrawn. Such simplified lifting is effected by an unlocking device provided for each mounting element at each mounting element location. Each unlocking device includes a double lever supported at one of the mounting elements, with the double lever comprising a load-bearing arm and a power arm. The load-bearing arm rests on an associated one of the sliding wedges, and the power arm can be extended in length for leverage purposes by placing a pipe into or onto the power arm so that the unlocking procedure can be performed with only a small expenditure of force. Since the double levers are tethered or secured to the various mounting elements, the present invention essentially eliminates the use of loose clamping parts such as screws and the like which can be lost following the disassembly of the platform device.

Advantageously, in accordance with the present invention, a platform device which is capable of being used as a support is provided. The platform device includes a platform; a rectangular frame coupled to and disposed beneath the platform; a plurality of mounting elements coupled to the rectangular frame at the corners of the rectangular frame, each of the mounting elements having a wedge chamber for receiving a supporting leg, and each of the wedge chambers having at least two walls which are inclined so that each wedge chamber tapers in the direction of the platform; a plurality of support legs releasably disposed within each of the wedge chambers of the mounting elements, respectively, with the support legs being capable of being inserted and fixedly clamped within each of the wedge chambers of the mounting elements, respectively; a plurality of sliding wedges respectively associated with each of the support legs, each of the sliding wedges being slidably disposed in contact with its associated support leg and the inclined walls of the wedge chamber of the mounting element in which the associated support leg is releasably disposed; and unlocking devices respectively arranged at each of the mounting elements for lifting the mounting elements off the sliding wedges.

In accordance with still further features of the present invention, each of the support legs can have a cross-sectional shape which is square; each of the wedge chambers can have a square shape in its horizontal cross-section and two vertical walls in addition to its inclined walls; each of the sliding wedges can have an L-shaped horizontal cross-section and two vertical inner sides; and each of the support legs can be located between the two vertical walls of the wedge chamber in which it is releasably disposed and the two vertical inner sides of the sliding wedge with which it is in contact.

Alternatively, each of the support legs can have a substantially circular cross-section; the inclined walls of each of the wedge chambers can be fashioned as conical shell surfaces; and each of the sliding wedges can be provided with a wedge surface having the shape of a conical shell.

In accordance with yet further features of the present invention, each of the sliding wedges and each of the unlocking devices is arranged on an inwardly located corner of one of the mounting elements. Also, each of the sliding wedges has an inwardly oriented top flange which rests on top of its associated support leg. Furthermore, each of the sliding wedges has a lower stop projection which subtends the mounting element with which it is in contact.

In accordance with still further features of the present invention, each of the unlocking devices includes an unlocking lever which is pivotably supported at a corresponding one of the mounting elements; a load-bearing arm extending through an aperture in the corresponding mounting element; and the unlocking lever can be coupled to a corresponding one of the sliding wedges in such a way that it pulls the corresponding sliding wedge away from its associated support leg during an unlocking procedure. Furthermore, the inclination of both the inclined walls of each wedge chamber and the outer walls of each sliding wedge which contact the inclined walls of each wedge chamber, respectively, can be 5° or approximately 5°.

The above and other objects, features, and advantages of the present invention will become more apparent from the following description when taken in connection with the accompanying drawings which, for the purpose of illustration only, show several embodiments in accordance with the present invention.

DETAILED DESCRIPTION OF THE DRAWINGS

Figure 1:
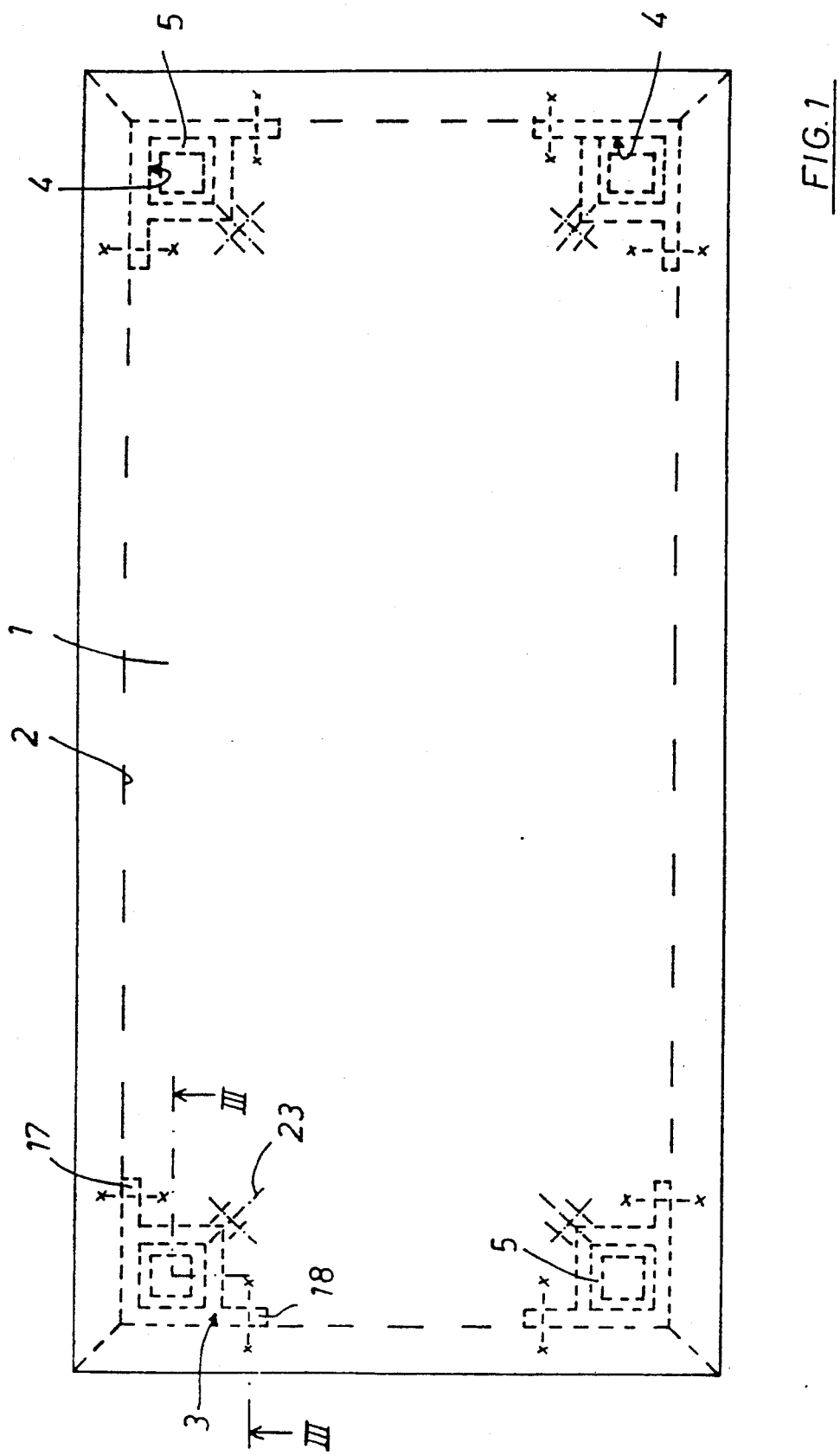
FIG. 1 is a top view of a platform trestle or device in accordance with a first embodiment of the present invention.

Referring now to the drawings wherein like reference numerals are used to designate like parts, and, more particularly, to FIG. 1, a first embodiment of the present invention is a platform trestle or device having a rectangular platform 1 carried or supported by a rectangular frame 2 located beneath the rectangular platform. Mounting elements, each of which is generally designated by a reference numeral 3, are fixedly connected to the rectangular frame 2 at the corner regions of the rectangular frame. In this connection, extension flanges 17, 18 extending from each of the mounting elements 3 are secured to the inner surfaces of the rectangular frame 2 so as to couple each of the mounting elements to the rectangular frame. Each of the mounting elements includes a wedge chamber having a mounting space 4 that is square in horizontal cross-section. Support legs 5 can be inserted within the various mounting spaces 4, whereby the platform 1 can be supported and elevated. Furthermore, each of the support legs 5 can be comprised of square pipe material. A double lever 23, as described in detail hereinbelow, can be secured to each of the mounting elements 3 in order to facilitate the removal of the support legs from the wedge chambers at the time of disassembly.

Figure 2:
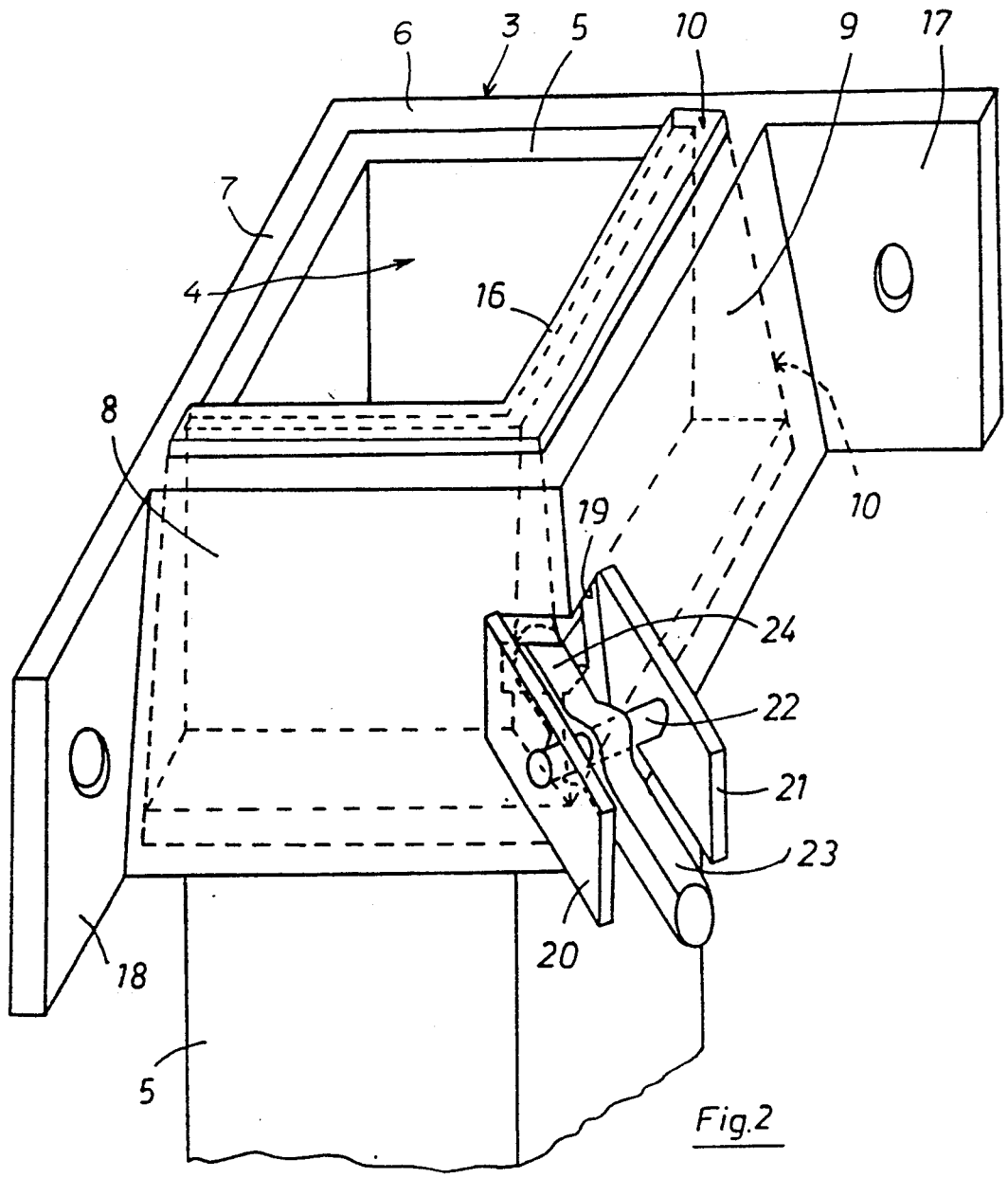
FIG. 2 is a perspective view schematically illustrating one of the mounting elements together with a sliding wedge and one of the support legs of the platform device shown in FIG. 1.
Figure 3:
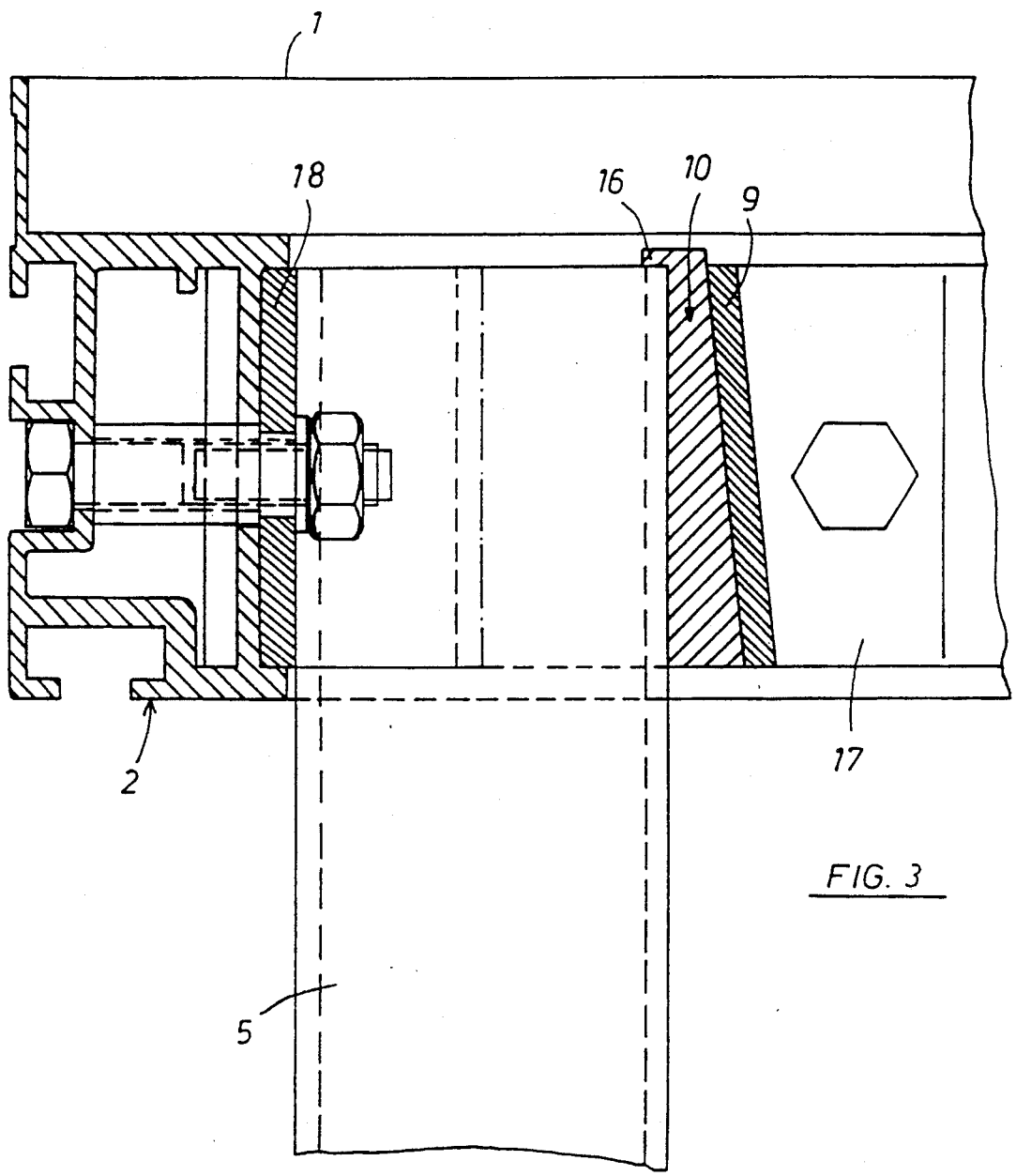
FIG. 3 is a section view of a portion of the platform device shown in FIG. 1 taken along line III—III.
Figure 4:
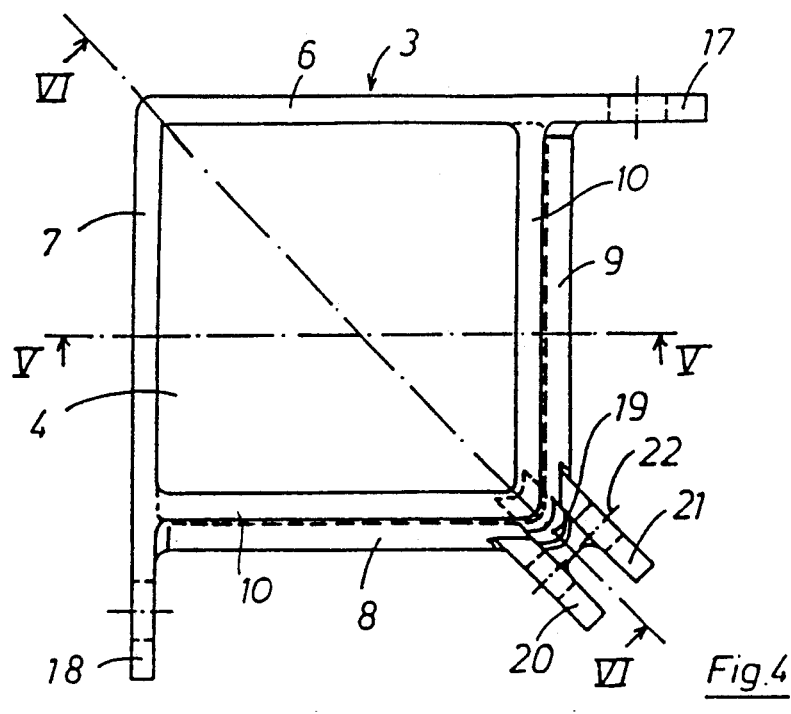
FIG. 4 is a top view of one of the mounting elements of the platform device shown in FIG. 1 but without the sliding wedge.
Figure 5:
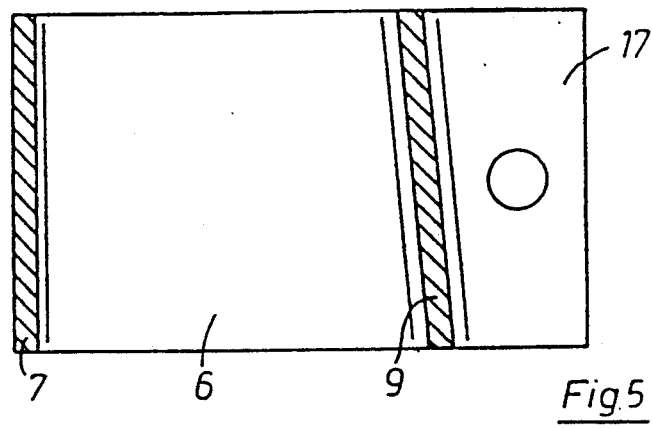
FIG. 5 is a section view of the mounting elements shown in FIG. 4 taken along line V—V.
Figure 6:
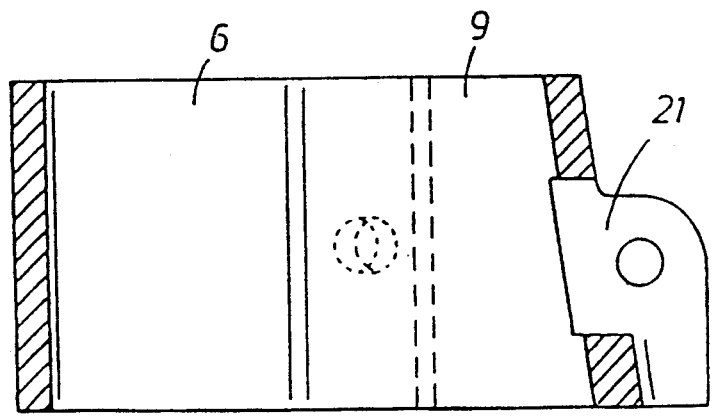
FIG. 6 is a section view of the mounting elements shown in FIG. 4 taken along line VI—VI.

As shown in FIGS. 2 and 4, the mounting space 4 of each of the mounting elements 3 is bounded by two adjoining vertical sides or walls 6, 7, which are connected to the rectangular frame 2 illustrated in FIGS. 1 and 3, and by two diametrically opposed inclined sides or walls 8, 9. The vertical walls 6, 7 and the inclined walls 8, 9, due to the inclination of the inclined walls, form a wedge chamber which tapers upwardly in the direction of the platform 1 illustrated in FIGS. 1 and 3. The tapered nature of the wedge chamber is clearly shown in FIG. 5, which is a section view of the mounting element of FIG. 4 taken along line V—V. Further details of the mounting element of FIG. 4 can be seen in FIG. 6, which is section view of the mounting element of FIG. 4 taken along line VI—VI.

Figure 7:
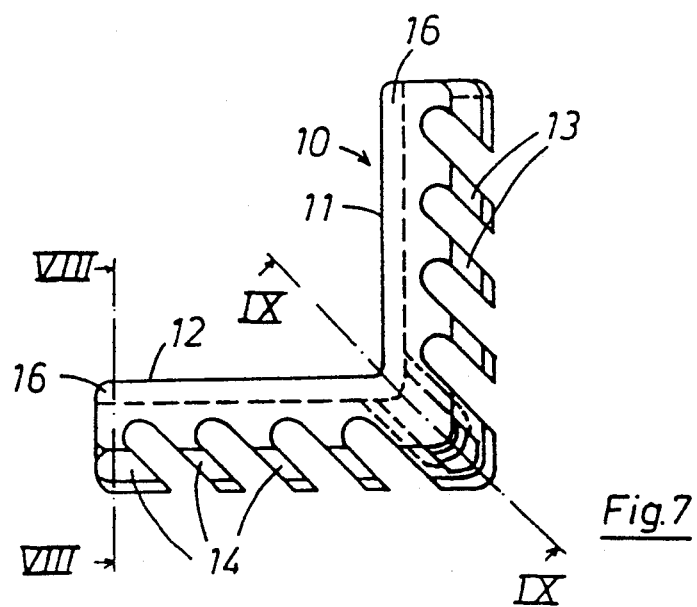
FIG. 7 is a top view of a sliding wedge which can be arranged between the support leg and the mounting element in the first embodiment of the present invention shown in FIG. 1.

A sliding wedge 10, as illustrated in FIGS. 2-4, is arranged within the mounting space 4 of each of the mounting elements 3. Each of the sliding wedges 10 has an L-shaped horizontal cross-section, and is arranged between the support leg 5 and the two inclined wedge chamber sides 8, 9 within each mounting element. The details of the sliding wedge 10 are shown in FIG. 7. As can be seen from FIG. 7, each sliding wedge has two vertical inner sides 11, 12 and two inclined outer surfaces or sides 13, 14. The inclined outer surfaces or sides 13, 14 are interrupted by grooves. With reference to FIGS. 2-4 and 7, each sliding wedge contacts its associated support leg 5 with its two vertical inner sides 11, 12, and is displaceable with its two inclined outer surfaces being movable along the inclined walls 8, 9 of the mounting element 3 in which its associated support leg is disposed.

Figure 8:
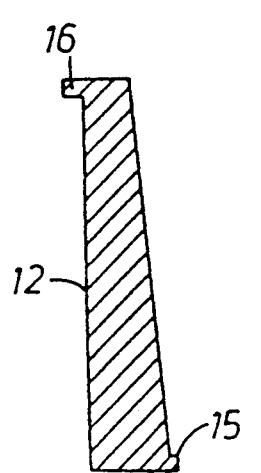
FIG. 8 is a section view of the sliding wedge shown in FIG. 7 taken along line VIII—VIII.
Figure 9:
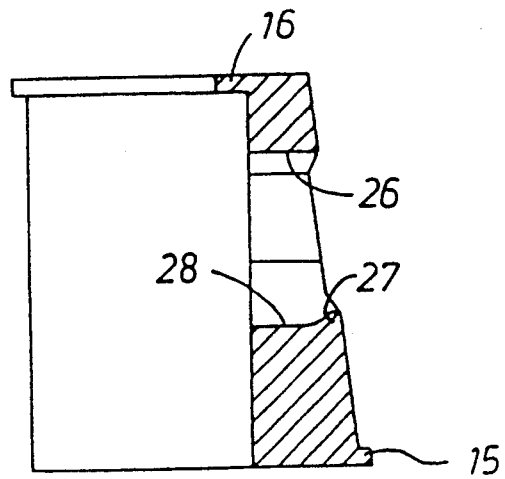
FIG. 9 is a section view of the sliding wedge shown in FIG. 7 taken along line IX—IX.

As illustrated in FIGS. 7-9, each of the sliding wedges 10 is provided with inwardly oriented flange 16 at an upper portion thereof, and also with a lower stop projection or flange 15 at a lower portion thereof. Each sliding wedge can be inserted from below into one of the mounting elements 3 until it reaches its maximum insertion position, as illustrated, for example, in FIGS. 2 and 3. The maximum insertion position is determined by the lower stop projection 15, which subtends the mounting element 3, such that the support leg 5 can be freely inserted into the wedge chamber only until lower stop portion 15 comes into contact with the bottom surface of the wedge chamber. In this position, namely, the maximum insertion position, the upper portion of sliding wedge 10 extends several millimeters above the mounting element 3. Inwardly oriented flange 16 is seated on the upper surface of the support leg 5, and is the means by which the sliding wedge 10 is moved toward platform 1 when a support leg is inserted and urged toward the platform within mounting element 3. Although not limited to the following specification, the inclination of both the inclined wedge chamber walls, 8, 9 and the inclined outer surfaces 13, 14 of sliding wedge 10 can be 5° or approximately 5°.

Figure 10:
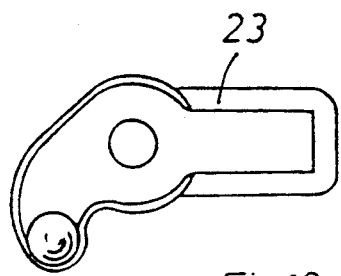
FIG. 10 is a side view of an unlocking lever which can be used in the first embodiment of the present invention shown in FIG. 1.
Figure 11:
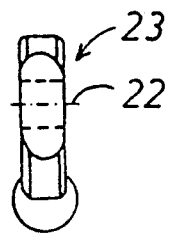
FIG. 11 is an end view of an unlocking lever which can be used in the first embodiment of the present invention shown in FIG. 1.
Figure 12:
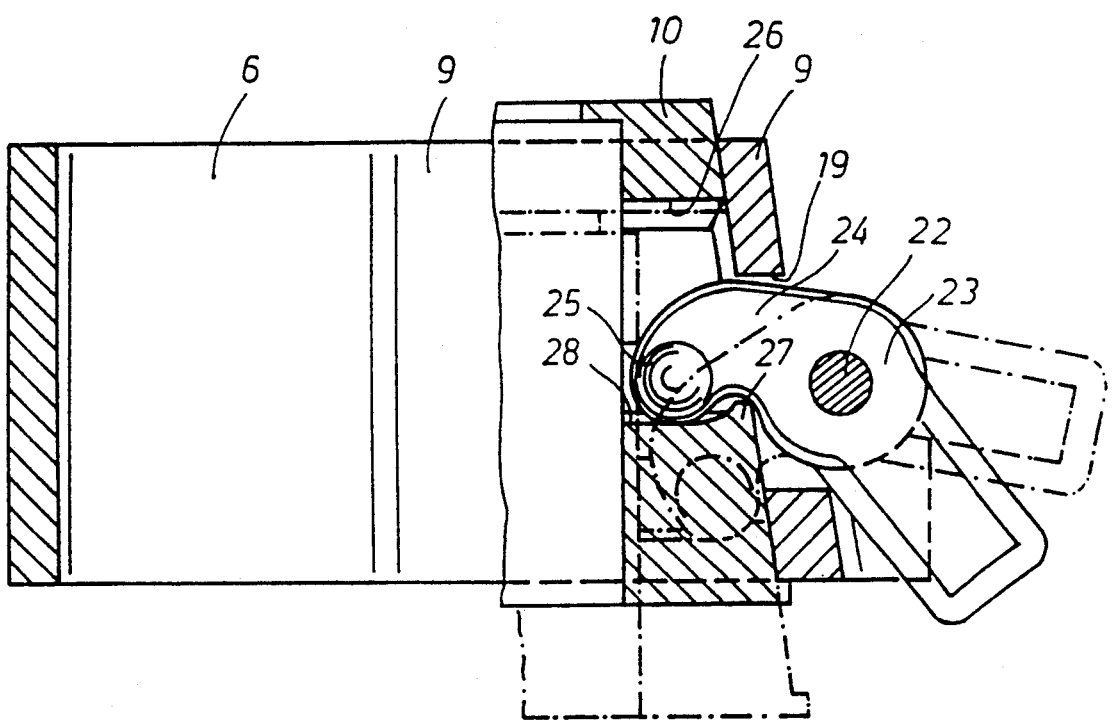
FIG. 12 is diagonal section view of a portion of the first embodiment of the present invention shown in FIG. 1 taken through the mounting element and the sliding wedge in the region of the unlocking device.

As stated previously, each of the mounting elements 3 is either permanently or removably secured to the rectangular frame 2 by extension flanges 17, 18, as shown in FIGS. 1-4. It can be seen from FIGS. 2, 4 and 12 that each moving element 3 has an aperture or perforation 19 at its interiorly disposed corner facing the corner of the rectangular frame 2. Disposed on both sides of aperture 19 are aperture extensions or eyes 20, 21, which are located on the outer sides of mounting element 3. An axle 22 is supported between the extensions 20, 21. The axle 22 supports a double lever 23, the details of which are shown in FIGS. 10-12, having a load-bearing arm 24 which penetrates aperture 19. Load-bearing arm 24 has a contact piece 25 disposed within the recess 26 of sliding wedge 10. As can be seen especially in FIG. 12, sliding wedge 10 is coupled to mounting element 3 by way of unlocking lever 23 so that the sliding wedge will not become lost or misplaced via detachment from the mounting element. Load-bearing arm 24 extends behind and beyond upwardly oriented lug 27 at the bottom 28 of recess 26 within sliding wedge 10.

Support legs 5 can be fastened to the mounting elements 3 in a simple manner by inserting the support legs from below the platform 1 into the mounting spaces 4 of the wedge chambers, with the support legs urging each sliding wedge 10 high into the mounting spaces until the outer wedge surfaces 13, 14 are in tight contact with the inner surfaces of inclined walls 8, 9 of the wedge chamber. As the load being exerted on platform 1 increases, the clamping of the support legs 5 within the mounting elements 3 becomes more firm, although it should be noted that the clamping is most effective when the support legs 5 are uniformly exposed to the clamping forces on all four sides.

As shown in FIG. 12, unlocking levers 23 can be manipulated for releasing the support legs 5 from the mounting elements 3. In this connection, an extension pipe (not shown) is placed into or onto the relatively short end of unlocking lever 23, and the extension pipe and relatively short end of unlocking lever 23 are pivoted upwards around axle 22, which serves as a pivot point. The pivoting of both the extension pipe and the relatively short end of unlocking lever 23 around axle 22 causes contact piece 25 of load-bearing arm 24 to bear downwards on bottom 28 of recess 26, thereby simultaneously pulling sliding wedge 10 downwards and away from the support leg 5, due to the impingement of contact piece 25 on lug 27. For reference purposes, FIG. 12 shows the locked position of unlocking lever 23 in solid lines, and the unlocking position of unlocking lever 23 in dotted lines. After releasing unlocking lever 23 by withdrawing the extension pipe from the relatively short end of the unlocking lever 23, all of the mounting components located within and associated with the mounting element 3 return to a position whereat the they are ready for a renewed insertion of one of the support legs 5 into the wedge chamber.

Figure 13:
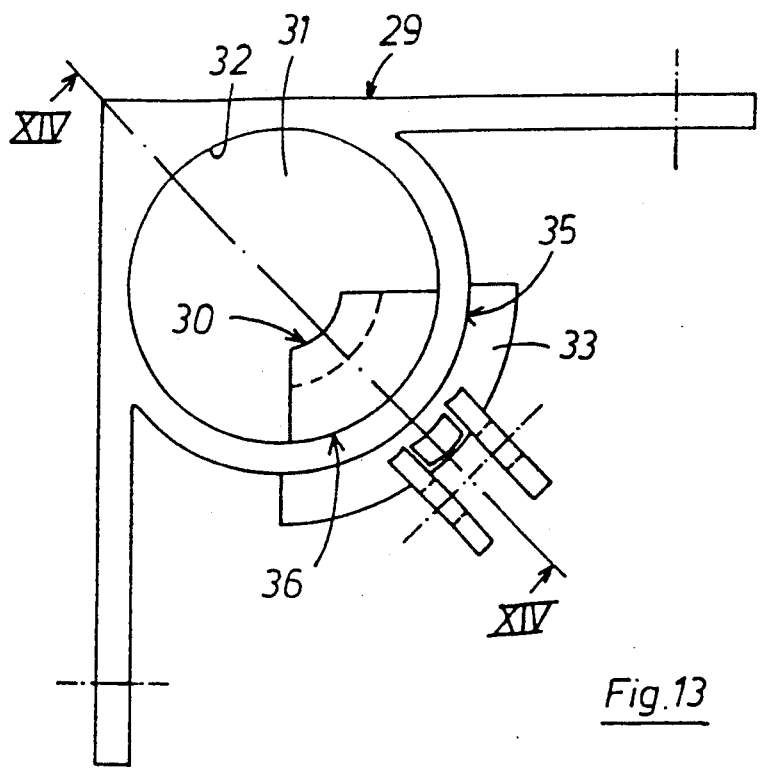
FIG. 13 is a top view of a mounting element and sliding wedge in a platform device in accordance with a second embodiment of the present invention.
Figure 14:
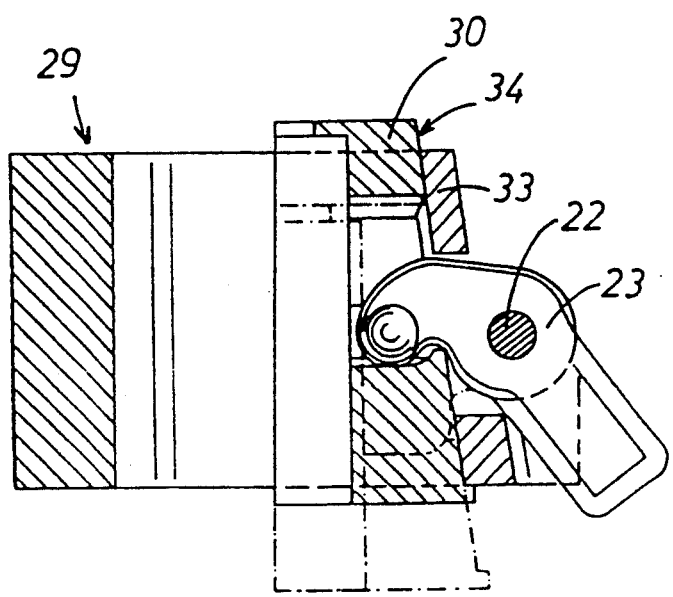
FIG. 14 is diagonal section view of the mounting element and the sliding wedge shown in FIG. 13 taken along line XIV—XIV.

FIGS. 13 and 14 are directed to a second embodiment of the present invention wherein round or substantially circular support legs are used instead of square support legs. As shown in FIGS. 13 and 14, each mounting element 29 can have a sliding wedge 30 for clamping round support legs fixedly in place within the mounting element. Each mounting element 29 has a wedge chamber including a mounting space 31 defined over an angular range of 270° or approximately 270° by a vertical cylindrical wall or side 32, and over an inwardly located corner region of 90° or approximately 90° located opposite the vertical cylindrical wall by a conical shell 33. Each sliding wedge 30 contacts with its outer surface 34 the inner surface of conical shell 33 and extends over an angular range of 90° or somewhat less than 90° in a peripheral direction. Since walls or conical sections or sides 35, 36 are inclined with respect to the vertical walls or sides of the wedge chamber and/or the other vertical surfaces of the platform device, the mounting space 31 of the wedge chamber tapers as it approaches the platform. Except for the fact that the second embodiment of the present invention shown in FIGS. 13 and 14 involves the use of round support legs and substantially circular cross-section wedge chambers rather than square support legs and square cross-section wedge chambers, the operation of the second embodiment is essentially the same as the first embodiment of the present invention shown in FIGS. 1–12.

While only several embodiments in accordance with the present invention have been shown and described, it should understood that the same is not limited thereto but is susceptible to numeral changes and modifications, and therefore the present invention should not be considered to be limited to the details shown and described herein, but should be considered to cover all such modifications as are encompassed by the scope of the appended claims.

I claim:

1. A platform device according to which is capable of being used as a support, said platform comprising:
    a platform;
    a rectangular frame coupled to and disposed beneath said platform;
    a plurality of mounting elements coupled to said rectangular frame at the corners of said rectangular frame, each of said mounting elements having a wedge chamber, and each of said wedge chambers having at least two walls which are inclined so that each wedge chamber tapers in the direction of said platform;
    a plurality of support legs releasably disposed within each of said wedge chambers of said mounting elements, respectively, said support legs being capable of being inserted and fixedly clamped within each of said wedge chambers of said mounting elements, respectively;
    a plurality of sliding wedges respectively associated with each of said support legs, each of said slide wedges being slidably disposed in contact with its associated support leg and the inclined walls of the wedge chamber of the mounting element in which said associated support leg is releasably disposed; and
    unlocking means respectively arranged on each of the mounting elements for displacing the respective sliding wedges relative to the respective mounting elements and associated support legs so as to release the respective support legs,
    wherein each of said unlocking means comprises an unlocking lever which is pivotably supported at a corresponding one of the mounting elements, which includes a load-bearing arm extending through an aperture in the corresponding mounting element, and which is coupled to a corresponding one of said sliding wedges in such a way that it pulls the corresponding sliding wedge away from its associated support leg during an unlocking procedure.

2. A platform device according to claim 1, wherein each of said sliding wedges has an inwardly oriented top flange which rests on top of its associated support leg.

3. A platform device according to claim 2, wherein each of said sliding wedges has a lower stop projection which subtends the mounting element with which it is in contact.

4. A platform device according to claim 1, wherein each of said sliding wedges is a lower stop projection which subtends the mounting element with which it is in contact.

5. A platform device according to claim 1, wherein the inclination of both the inclined walls of each wedge chamber and outer walls of each sliding wedge which contact the inclined walls of each wedge chamber, respectively, is substantially 5°.

6. A platform device which is capable of being used as a support, said platform device comprising:
    a platform;
    a rectangular frame coupled to and disposed beneath said platform;
    a plurality of mounting elements coupled to said rectangular frame at the corners of said rectangular frame at the corners of said rectangular frame, each of said mounting elements having a wedge chamber, each of said wedge chambers having at least two walls which are inclined so that the wedge chamber tapers in the direction of said platform;
    a plurality of support legs releasably disposed within each of said wedge chambers of said mounting elements, respectively, said support legs being capable of being inserted and fixedly clamped within each of said wedge chambers of said mounting elements, respectively;
    a plurality of sliding wedges respectively associated with each of said support legs, each of said slide wedges being slidably disposed in contact with its associated support leg and the inclined walls of the wedge chamber of the mounting element in which said associated support leg is releasably disposed, each of said slide wedges including an inwardly oriented top flange which rests on top of its associated support leg; and
    unlocking means respectively arranged on each of the mounting elements for displacing the respective sliding wedges relative to the respective mounting elements and associated support legs so as to release the respective support legs,
    wherein each of said unlocking means comprises an unlocking lever which is pivotably supported at a corresponding one of the mounting elements, which includes a load-bearing arm extending through an aperture in the corresponding mounting element, and which is coupled to a corresponding one of said sliding wedges in such a way that it pulls the corresponding sliding wedge away from its associated support leg during an unlocking procedure.

7. A platform device according to claim 6, wherein the inclination of both the inclined walls of each wedge chamber and outer walls of each sliding wedge which contact the inclined walls of each wedge chamber, respectively, is substantially 5°.

8. A platform device which is capable of being used as a support, said platform device comprising:
    a platform;
    a rectangular frame coupled to and disposed beneath said platform;
    a plurality of mounting elements coupled to said rectangular frame at the corners of said rectangular frame, each of said mounting elements have a wedge chamber, each of said wedge chambers having at least two walls which are inclined so that each wedge chamber tapers in the direction of said platform;

a plurality of support legs releasably disposed within each of said wedge chambers of said mounting elements, respectively, said support legs being capable of being inserted and fixedly clamped within each of said wedge chambers of said mounting elements, respectively;

a plurality of sliding wedges respectively associated with each of said support legs, each of said slide wedges being slidably disposed in contact with its associated support leg and the inclined walls of the wedge chamber of the mounting element in which said associated support leg is releasably disposed, each of said sliding wedges has a lower stop projection which subtends the mounting element with which it is contact; and unlocking means respectively arranged on each of the mounting elements for displacing the respective sliding wedges relative to the respective mounting elements and associated support legs so as to release the respective support legs, wherein each of said unlocking means comprises an unlocking lever which is pivotably supported at a corresponding one of the mounting elements, which includes a load-bearing arm extending through an aperture in the corresponding mounting element, and which is coupled to a corresponding one of said sliding wedges in such a way that it pulls the corresponding sliding wedge away from its associated support leg during an unlocking procedure.

9. A platform device according to claim 8, wherein the inclination of both the inclined walls of each wedge chamber and outer walls of each sliding wedge which contact the inclined walls of each wedge chamber, respectively, is substantially 5°.

10. A platform device which is capable of being used as a support, said platform device comprising:

a platform;

a rectangular frame coupled to and disposed beneath said platform;

a plurality of mounting elements coupled to said rectangular frame at the corners of said rectangular frame, each of said mounting elements have a wedge chamber, each of said wedge chambers having at least two walls which are inclined so that each wedge chamber tapers in the direction of said platform;

a plurality of support legs releasably disposed within each of said wedge chambers of said mounting elements, respectively, said support legs being capable of being inserted and fixedly clamped within each of said wedge chambers of said mounting elements, respectively;

a plurality of sliding wedges respectively associated with each of said support legs, each of said slide wedges being slidably disposed in contact with its associated support leg and the inclined walls of the wedge chamber of the mounting element in which said associated support leg is releasably disposed, each of said sliding wedges has an inwardly oriented top flange which rests on top of its associated support leg and a lower stop projection which subtends the mounting element with which it is in contact; and unlocking means respectively arranged on each of the mounting elements for displacing the respective sliding wedges relative to the respective mounting elements and associated support legs so as to release the respective support legs, wherein each of said unlocking means comprises an unlocking lever which is pivotably supported at a corresponding one of the mounting elements, which includes a load-bearing arm extending through an aperture in the corresponding mounting element, and which is coupled to a corresponding one of said sliding wedges in such a way that it pulls the corresponding sliding wedge away from its associated support leg during an unlocking procedure.

11. A platform device according to claim 10, wherein the inclination of both the inclined walls of each wedge chamber and outer walls of each sliding wedge which contact the inclined walls of each wedge chamber, respectively, is substantially 5°.

12. A platform device according to one of claims 1, 6, 8 or 10, wherein:

each of said support legs has a cross-sectional shape which is square;

each of said wedge chambers has a square shape in its horizontal cross-section and two vertical walls in addition to its inclined walls;

each of said sliding wedges has an L-shaped horizontal cross-section and two vertical inner sides; and each of said support legs is located between the two vertical walls of the wedge chamber in which it is releasably disposed and the two vertical inner sides of the sliding wedge with which it is in contact.

13. A platform device according to claim 12, wherein each of said sliding wedges and each of said unlocking means are arranged on an inwardly located corner of one of said mounting elements.

14. A platform device according to one of claims 1, 6, 8 or 10, wherein:

each of said support legs has a substantially circular cross-section;

the inclined walls of each of said wedge chambers are fashioned as conical shell surfaces; and each of said sliding wedges is provided with a wedge surface having the shape of a conical shell.

15. A platform device according to claim 14, wherein each of said sliding wedges and each of said unlocking means are arranged on an inwardly located corner of one of said mounting elements.

* * * * *